(12) United States Patent
Langley

(10) Patent No.: US 9,172,692 B2
(45) Date of Patent: Oct. 27, 2015

(54) SYSTEMS AND METHODS FOR SECURELY TRANSFERRING AUTHENTICATION INFORMATION BETWEEN A USER AND AN ELECTRONIC RESOURCE

(71) Applicant: William M. Langley, Portland, OR (US)

(72) Inventor: William M. Langley, Portland, OR (US)

( * ) Notice: Subject to any disclaimer, the term of this patent is extended or adjusted under 35 U.S.C. 154(b) by 17 days.

(21) Appl. No.: 14/207,065

(22) Filed: Mar. 12, 2014

(65) Prior Publication Data
US 2014/0282973 A1 Sep. 18, 2014

Related U.S. Application Data

(60) Provisional application No. 61/782,232, filed on Mar. 14, 2013.

(51) Int. Cl.
*H04L 29/06* (2006.01)
*G06F 21/36* (2013.01)

(52) U.S. Cl.
CPC ............... *H04L 63/08* (2013.01); *G06F 21/36* (2013.01); *H04L 63/083* (2013.01)

(58) Field of Classification Search
CPC ......... G06F 21/36; G06F 21/31; H04L 63/08; H04L 63/083
USPC .......................................................... 726/7
See application file for complete search history.

(56) References Cited

U.S. PATENT DOCUMENTS

| 5,559,961 | A | 9/1996 | Blonder |
| 6,571,336 | B1 | 5/2003 | Smith, Jr. |
| 6,583,716 | B2 | 6/2003 | Rangarajan et al. |
| 6,950,949 | B1 | 9/2005 | Gilchrist |
| 7,000,116 | B2 | 2/2006 | Bates et al. |
| 7,093,282 | B2 | 8/2006 | Hillhouse |
| 7,219,368 | B2 | 5/2007 | Juels et al. |

(Continued)

FOREIGN PATENT DOCUMENTS

| EP | 2 254 071 | 11/2010 |
| EP | 2287773 | 2/2011 |

OTHER PUBLICATIONS

ArunPrakash, M., and T. R. Gokul. "Network security-overcome password hacking through graphical password authentication." Innovations in Emerging Technology (NCOIET), 2011 National Conference on. IEEE, 2011.*

*Primary Examiner* — Syed Zaidi
(74) *Attorney, Agent, or Firm* — DASCENZO Intellectual Property Law, P.A.

(57) ABSTRACT

Systems and methods for securely transferring authentication information between a user and an electronic resource are disclosed herein. The methods include providing an authentication image to a user interface. The authentication image is associated with a resource-side coordinate system and the providing includes encoding the resource-side coordinate system to generate a user-side coordinate system that is different from the resource-side coordinate system and transmitting the authentication image and the user-side coordinate system to the user interface. The methods further include receiving an encoded coordinate set, which uniquely identifies an authentication location in the user-side coordinate set and that is user-selected from the authentication image, from the user interface and decoding the encoded coordinate set to generate a decoded coordinate set that uniquely identifies the authentication location in the resource-side coordinate set. The systems include systems that perform the methods.

17 Claims, 4 Drawing Sheets

(56) References Cited

U.S. PATENT DOCUMENTS

| | | |
|---|---|---|
| 7,373,516 B2 | 5/2008 | Ashok et al. |
| 7,536,556 B2 | 5/2009 | Fedorova et al. |
| 7,539,874 B2 | 5/2009 | Waterland |
| 7,616,764 B2 * | 11/2009 | Varghese et al. ............... 380/255 |
| 7,734,930 B2 | 6/2010 | Kirovski et al. |
| 7,739,733 B2 | 6/2010 | Szydlo |
| 7,886,345 B2 | 2/2011 | Kaliski et al. |
| 7,953,983 B2 | 5/2011 | Holt et al. |
| 8,117,458 B2 | 2/2012 | Osborn, III et al. |
| 8,127,141 B2 | 2/2012 | Hyppönen |
| 8,181,029 B2 | 5/2012 | Cheswick |
| 8,234,502 B2 | 7/2012 | Dick et al. |
| 8,281,147 B2 | 10/2012 | Florencio et al. |
| 2003/0034879 A1 | 2/2003 | Rangarajan et al. |
| 2004/0230843 A1 | 11/2004 | Jansen |
| 2004/0250138 A1 | 12/2004 | Schneider |
| 2006/0174339 A1 * | 8/2006 | Tao ................................ 726/18 |
| 2006/0206717 A1 | 9/2006 | Holt et al. |
| 2007/0130618 A1 | 6/2007 | Chen |
| 2008/0016369 A1 | 1/2008 | Kirovski et al. |
| 2008/0052245 A1 | 2/2008 | Love |
| 2008/0235788 A1 | 9/2008 | El Saddik et al. |
| 2008/0244700 A1 | 10/2008 | Osborn et al. |
| 2008/0320310 A1 | 12/2008 | Florencio et al. |
| 2009/0249076 A1 | 10/2009 | Reed et al. |
| 2010/0169958 A1 | 7/2010 | Werner et al. |
| 2010/0186074 A1 | 7/2010 | Stavrou et al. |
| 2010/0287381 A1 | 11/2010 | Dick et al. |
| 2010/0287382 A1 | 11/2010 | Gyorffy et al. |
| 2011/0040946 A1 | 2/2011 | Courtney |
| 2011/0047606 A1 | 2/2011 | Blomquist et al. |
| 2011/0055548 A1 | 3/2011 | Varghese et al. |
| 2011/0055585 A1 | 3/2011 | Lee |
| 2011/0072510 A1 * | 3/2011 | Cheswick ........................ 726/18 |
| 2011/0197070 A1 * | 8/2011 | Mizrah .......................... 713/176 |
| 2011/0202982 A1 | 8/2011 | Alexander et al. |
| 2012/0011564 A1 | 1/2012 | Osborn et al. |
| 2012/0117634 A1 | 5/2012 | Halls et al. |
| 2013/0347087 A1 * | 12/2013 | Smith ............................... 726/7 |

* cited by examiner

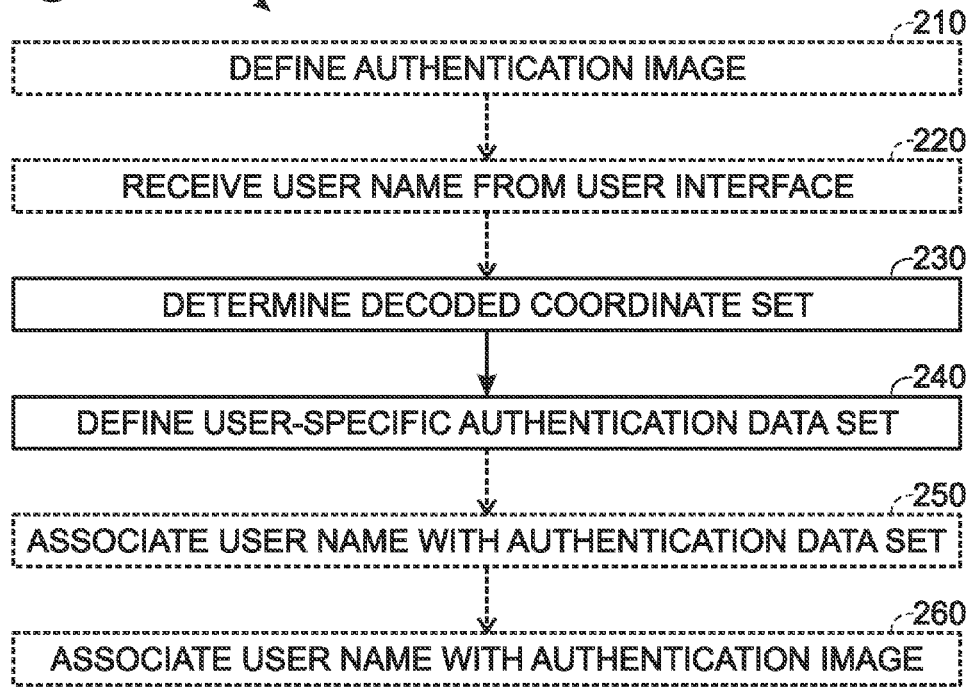
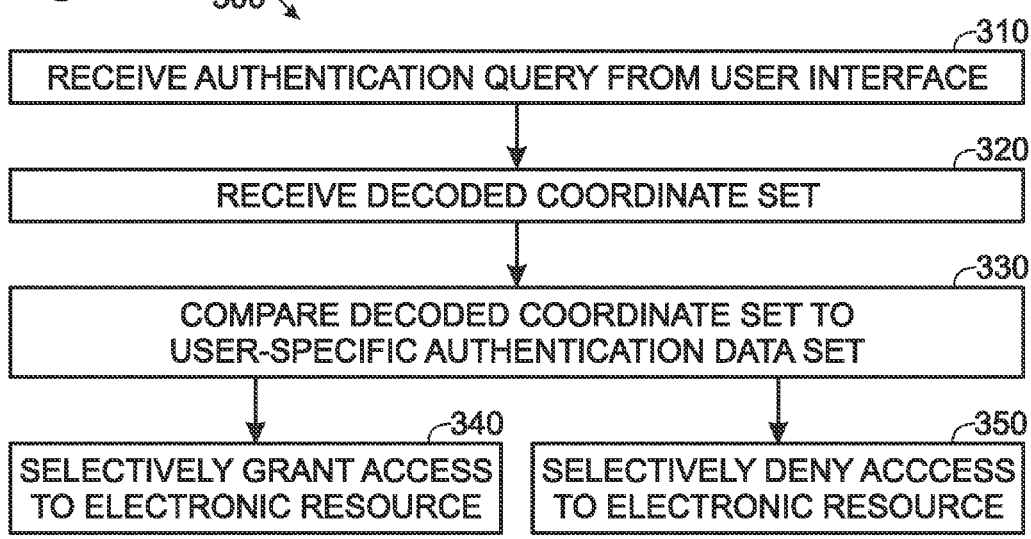

SYSTEMS AND METHODS FOR SECURELY TRANSFERRING AUTHENTICATION INFORMATION BETWEEN A USER AND AN ELECTRONIC RESOURCE

RELATED APPLICATION

The present application claims priority under 35 U.S.C. §119(e) to U.S. Provisional Patent Application No. 61/782,232, which is entitled "SYSTEMS AND METHODS FOR SECURELY RECEIVING AUTHENTICATION INFORMATION FROM A USER INTERFACE," which was filed on Mar. 14, 2013, the disclosure of which is hereby incorporated by reference.

FIELD OF THE DISCLOSURE

The present disclosure is directed generally to systems and methods for securely transferring authentication information between a user and an electronic resource, and more particularly to systems and methods that utilize image-based authentication information with different user-side and resource-side coordinate systems.

BACKGROUND OF THE DISCLOSURE

Traditional alphanumeric passwords suffer from a variety of limitations. One limitation relates to a user's ability to remember a strong password that is not easily guessed using automated and/or manual attack methodologies. For example, a long, random sequence of numbers, letters, and/or characters may be utilized to generate a strong password that is not easily guessed or otherwise ascertained. However, most users have difficulty remembering such a strong password and will either write it down (producing the possibility of the password being physically stolen or otherwise visually observed) or will choose a simpler (weak) password that is based upon information that is familiar to the user (such as significant dates, names, and/or dictionary words) or uses fewer and/or repetitive characters. While these weak passwords may be readily remembered, they also may be readily guessed, thereby increasing the likelihood that the weak password may be compromised.

These issues are compounded by the fact that most users have a large number of electronic accounts (such as personal email, personal network, work email, work network, bank accounts, brokerage accounts, credit card accounts, retail accounts, etc.) and that each of these electronic accounts may have its own respective password for access thereto. Thus, a user is presented with a dilemma. In the interest of being able to remember the respective passwords, the user might select the same password for several, or even all, electronic accounts. However, if this password is stolen or otherwise compromised, all of the electronic accounts that utilize this password may be compromised. Alternatively, the user might choose a different password for each electronic account (whether weak or strong); however, the user then must remember different passwords for all of these accounts.

In addition, and regardless of the strength of a selected password, malicious software exists that may be utilized to steal a password from a targeted user. For example, keystroke logging software may capture a sequence of keys that is entered by the user while logging in to an electronic resource, and an unauthorized individual may utilize these logged keystrokes to log into the electronic resource without the user's permission. Alternatively, and even if the password is entered securely by the user, it may be intercepted during transmission from the user to the electronic resource. For example, many selected passwords, regardless of their individual strength, are vulnerable to being compromised (i.e., stored, copied, or otherwise identified) during transmission from the user (client/user side) to the corresponding remote site (server/resource side).

Graphical, or graphic-based, passwords have been utilized to generate strong passwords that may be more readily remembered by the user. Illustrative, non-exclusive examples of graphical passwords, including methods for generating and/or utilizing such passwords, are disclosed in U.S. Pat. No. 8,181,029 and U.S. Patent Application Publication Nos. 2011/0040946 and 2011/0055585, the complete disclosures of which are hereby incorporated by reference. However, these graphic-based passwords still suffer from inherent limitations and/or still may be compromised and/or intercepted during transmission. Thus, there exists a need for improved systems and methods for secure electronic authentication.

SUMMARY

Systems and methods for securely transferring authentication information between a user and an electronic resource are disclosed herein. The methods include providing an authentication image to a user interface. The authentication image is associated with a resource-side coordinate system, and the providing includes encoding the resource-side coordinate system to generate a user-side coordinate system that is different from the resource-side coordinate system and transmitting the authentication image and the user-side coordinate system to the user interface. The methods further include receiving an encoded coordinate set, which uniquely identifies an authentication location in the user-side coordinate set and that is user-selected from the authentication image, from the user interface and decoding the encoded coordinate set to generate a decoded coordinate set that uniquely identifies the authentication location in the resource-side coordinate set.

The authentication image may include a map or other graphic image of sufficient scalable/adjustable resolution, and the authentication information may include and/or be a password for gaining access to the electronic resource. The providing the authentication image may include providing an initial image to the user interface, receiving an image display modification instruction from the user interface, and modifying the initial image based upon the image display modification instruction to generate an intermediate image and/or to generate the authentication image. The image display modification instruction may include a pan instruction, a zoom instruction, and/or a navigation instruction. The initial image may be a subset of an image data set that defines an overall image, and the methods further may include randomly selecting a portion of the image data set that comprises the initial image.

The encoding may include encoding with a session-specific coordinate transformation. The encoding further may include performing a mathematical operation on the resource-side coordinate system to generate the user-side coordinate system. The mathematical operation may include adding a constant to the resource-side coordinate system, multiplying the resource-side coordinate system by the constant, and/or applying a mathematical function to the resource-side coordinate system. The resource-side coordinate system may define a plurality of coordinate axes, and the encoding may include encoding each of the coordinate axes. The decoding may include reversing the session-specific coordinate transformation.

The methods may include receiving the encoded coordinate set without the user inputting keystrokes on a keyboard. Additionally or alternatively, the methods may be performed without transferring the decoded coordinate set between the user interface and the electronic resource. The providing the authentication image may include providing the authentication image without storing the authentication image on, or within, the user interface.

The methods further may include methods of defining authentication information to authenticate the user. The defining may include determining a user-specific authentication data set that is based upon the decoded coordinate set. The defining further may include receiving a user name, associating the user name with the authentication data set, and/or associating the user name with the authentication image.

The methods also may include methods of authenticating the user for access to the electronic resource. The authenticating may include receiving an authentication query and comparing the decoded coordinate set to the user-specific authentication data set. The methods further may include selectively granting the user access to the electronic resource responsive to determining that the decoded coordinate set corresponds to the user-specific authentication data set or selectively denying the user access to the electronic resource responsive to determining that the decoded coordinate set does not match the user-specific authentication data set.

The systems include systems that perform the methods. The systems may include computer readable storage medium including computer-executable instructions that, when executed, direct the electronic resource to perform the methods. The systems also may include the user interface, the electronic resource, and an information transfer mechanism that is configured to transfer information between the user interface and the electronic resource.

BRIEF DESCRIPTION OF THE DRAWINGS

FIG. 9 is a flowchart depicting methods according to the present disclosure for defining authentication information to authenticate a user for access to an electronic resource.

FIG. 10 is a flowchart depicting methods according to the present disclosure for authenticating a user for access to an electronic resource from a user interface.

DETAILED DESCRIPTION AND BEST MODE OF THE DISCLOSURE

Figure 1:
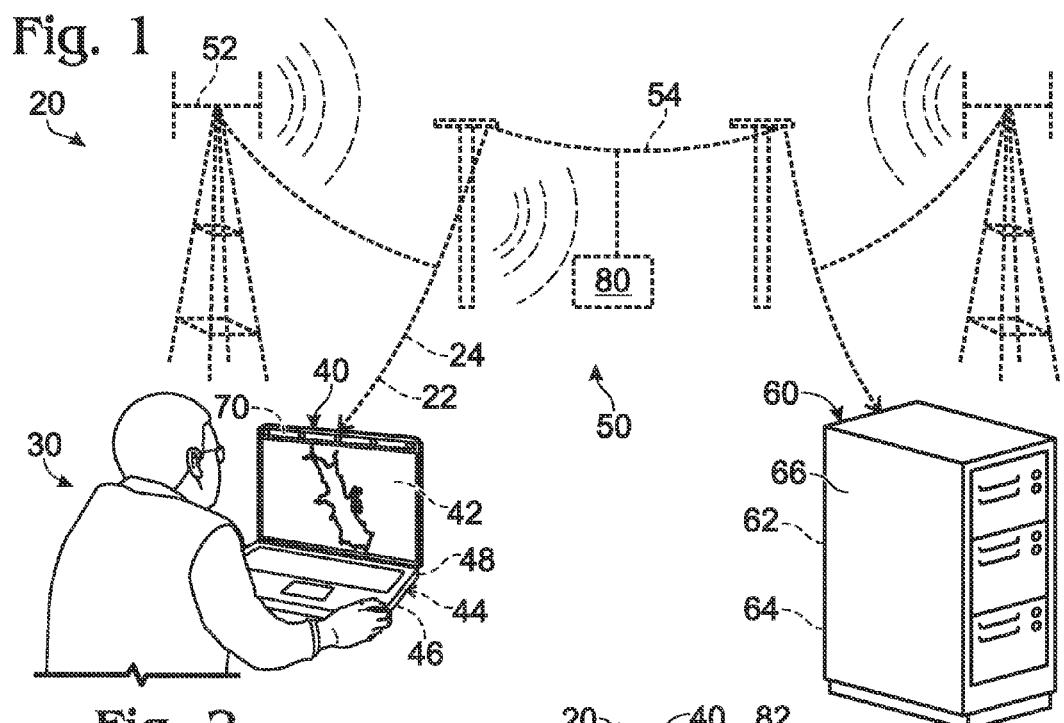
FIG. 1 is a schematic representation of illustrative, non-exclusive examples of an information transfer system that may be utilized with, and/or that may include, the systems and methods according to the present disclosure.

FIG. 1 is a schematic representation of illustrative, non-exclusive examples of an information transfer system 20 that may be utilized with, and/or that may include, the systems and methods according to the present disclosure. Information transfer system 20 may be configured to convey information 22 between a user 30 and an electronic resource 60 via a user interface 40 and an information transfer mechanism 50.

As an illustrative, non-exclusive example, user interface 40 may include and/or be any suitable electronic device that may permit and/or facilitate communication between user 30 and electronic resource 60. In addition, electronic resource 60 may include and/or be any suitable electronic resource for which user 30 may require authentication prior to access to protected information 66 that is contained thereon and/or accessed therefrom. Under these conditions, electronic resource 60 may be configured and/or programmed to authenticate user 30 prior to permitting access to protected information 66 (or prior to transferring protected information 66 to user interface 40). This authentication may include transferring authentication information 24 between user interface 40 and electronic resource 60.

Information transfer system 20 and/or electronic resource 60 thereof may be programmed and/or otherwise configured or utilized such that authentication information 24 may not be intercepted by an unauthorized entity and/or such that, if authentication information 24 is intercepted by the unauthorized entity, the authentication information will be unreadable by the unauthorized entity and/or will not be useful to the unauthorized entity to gain access to the user's protected information. This may include operation of information transfer system 20 using any of the methods 100, 200, and/or 300 that are discussed in more detail herein.

As an illustrative, non-exclusive example, the authentication information may be masked and/or otherwise augmented or encoded so that it is not useful to the unauthorized entity to authenticate the unauthorized entity, for example, at a different time, from a different information transfer system, and/or in a different session.

As another illustrative, non-exclusive example, if user interface 40 has malicious software 70 contained, and/or otherwise operating, thereon without the knowledge of user 30, information transfer system 20 may be configured to protect authentication information 24 from being intercepted by malicious software 70 (or from being intercepted in a form that may be utilized by malicious software 70 to gain access to protected information 66 on electronic resource 60). As a more specific but still illustrative, non-exclusive example, malicious software 70 may include and/or be keystroke logging software, and information transfer system 20 may be configured to permit authentication of user 30 without the user typing a user's authentication information on a keyboard that is associated with user interface 40, thereby avoiding capture of authentication information 24 by malicious software 70. As another illustrative, non-exclusive example, malicious software 70 may be configured to access information that is stored upon user interface 40, and information transfer system 20 may be configured to permit authentication of user 30 without storing authentication information 24 on the user interface.

As another illustrative, non-exclusive example, malicious software 70 may be configured to intercept authentication information 24 as it is transferred between user interface 40 and electronic resource 60. Additionally or alternatively, an information intercept mechanism 80 may be in communication with information transfer mechanism 50 and may be configured to intercept the authentication information. Thus, and as discussed in more detail herein, information transfer system 20 and/or electronic resource 60 thereof may be utilized and/or configured to encode authentication information 24 prior to transmitting the authentication information between the user interface and the electronic resource. This may place the authentication information in a form that does not permit malicious software 70 and/or information intercept mechanism 80 to gain access to protected information 66 and/or that does not permit malicious software 70 and/or information intercept mechanism 80 to facilitate access to protected information 66 by an unauthorized individual.

Illustrative, non-exclusive examples of user interface 40 include any suitable device that may include a display 42 and an input device 44, such as a pointing device 46 and/or a touch screen 48 that may permit the user to enter information without the use of a keyboard. Additional illustrative, non-exclusive examples of user interface 40 include any suitable personal computer, public and/or shared computer, personal computing device, laptop computer, wireless computer, tablet device, electronic device, cellular phone, smartphone, personal digital assistant, and/or terminal. Illustrative, non-exclusive examples of pointing devices 46 include mice, trackballs, styluses, wireless pointers, keyboards, scratch pads, and/or joysticks.

Illustrative, non-exclusive examples of information transfer mechanism 50 include any suitable wireless communication link 52, wired communication link 54, cellular communication link, an intranet, and/or the Internet. Illustrative, non-exclusive examples of electronic resource 60 include any suitable computing resource 62 that may include a memory device 64, which also may be referred to herein as a storage media 64. Electronic resource 60, computing resource 62, and/or memory device 64 may contain and/or house protected information 66 and/or may define a user account, an information vault, and/or an access gateway that may be configured to selectively permit access to protected information 66. Illustrative, non-exclusive examples of protected information 66 include any suitable online account, remotely accessible personal or network account, email account, information vault, information storage location, login storage location, password storage location, and/or bank account. Illustrative, non-exclusive examples of malicious software 70 include any suitable information logging software, keystroke logging software, and/or screen capture software.

As discussed, the systems and methods disclosed herein may be utilized to increase the security of authentication information (such as a password) that may be entered into user interface 40 (such as a personal computing device) by user 30 and subsequently conveyed to electronic resource 60 (such as a computing resource that may include, contain, and/or house an online account). Additionally or alternatively, the systems and methods also may increase the security of the authentication information as it is conveyed from electronic resource 60 to user interface 40, and it is within the scope of the present disclosure that this authentication information may be utilized in any suitable manner.

As an illustrative, non-exclusive example, the systems and methods disclosed herein may be utilized to establish and/or log into an account that may reside on and/or that may be maintained by electronic resource 60, such as a bank account, an email account, and/or any other suitable user account. As another illustrative, non-exclusive example, the systems and methods disclosed herein may be utilized to establish and/or log into an information vault that may reside on and/or that may be maintained by electronic resource 60. This information vault may contain information that the user desires to protect from unauthorized individuals, such as login information for other electronic accounts, bank account information, credit card information, and/or other personal, or sensitive, information. As yet another illustrative, non-exclusive example, the systems and methods disclosed herein may be utilized to establish and/or log into an access gateway that may reside on and/or be maintained by electronic resource 60. This access gateway may selectively permit access to another electronic resource subsequent to user authentication thereby.

As discussed in more detail herein with reference to methods 100, 200, and/or 300, the systems and methods disclosed herein may include the use of graphical, or visual, authentication information, such as an authentication image, that may be displayed on user interface 40. The graphical authentication information may be readily remembered by the user but may, at the same time, provide a desired level of complexity for generation of a "strong" password therefrom. In addition, the use of graphical authentication information may permit the user to enter the authentication information into the user interface without the use of a keyboard to enter alphanumeric characters for a password, thereby decreasing a potential for the authentication information to be intercepted and/or utilized by an unauthorized individual. Thus, the systems and methods disclosed herein may not only increase the security of the authentication information, but also may permit the user to utilize less secure user interfaces (such as shared and/or public computers) and/or less secure information transfer mechanisms (such as shared, or public, wireless networks, or hotspots) without the authentication information being compromised.

Figure 2:
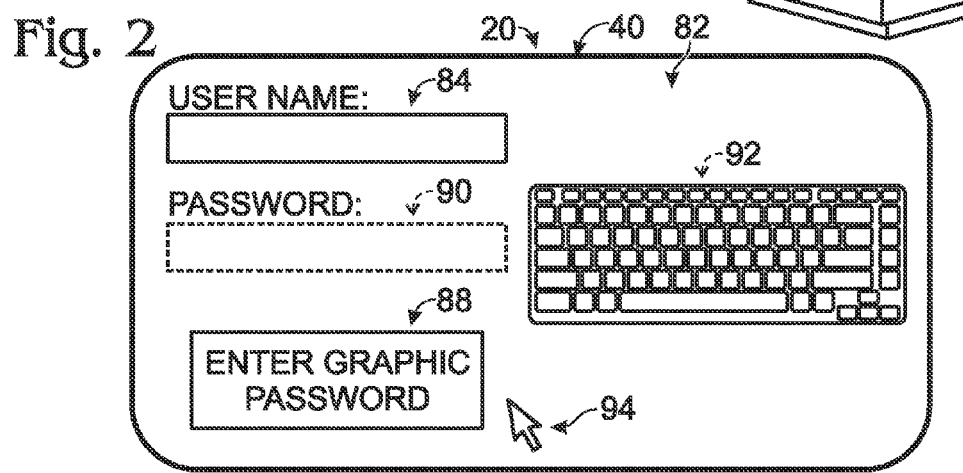
FIG. 2 is a schematic representation of illustrative, non-exclusive examples of information according to the present disclosure that may be displayed on a user interface.

FIGS. 2-7 provide illustrative, non-exclusive examples of information that may be displayed on user interface 40 when information transfer system 20 is utilized to authenticate user 30 for access to electronic resource 60 (as illustrated in FIG. 1). As illustrated in FIG. 2, user interface 40 initially may display a login screen 82. The login screen may permit the user to enter a user name 84 and a password 86. In the systems and methods disclosed herein, password 86 generally is a graphical password, as indicated at 88; however, it is within the scope of the present disclosure that login screen 82 optionally also may permit the use to enter an alphanumeric password, as indicated in dashed lines at 90.

As discussed in more detail herein, the systems and methods according to the present disclosure may be configured such that malicious software, such as keystroke logging software, cannot capture the user name and/or the password that is entered by the user. With this in mind, login screen 82 further may include a graphical keyboard 92. Thus, the user may enter the user name and/or the password by utilizing a cursor 94 to select one or more characters on the graphical keyboard and/or (in the case of touch screens), by utilizing a stylus or the user's finger/s.

Figure 3:
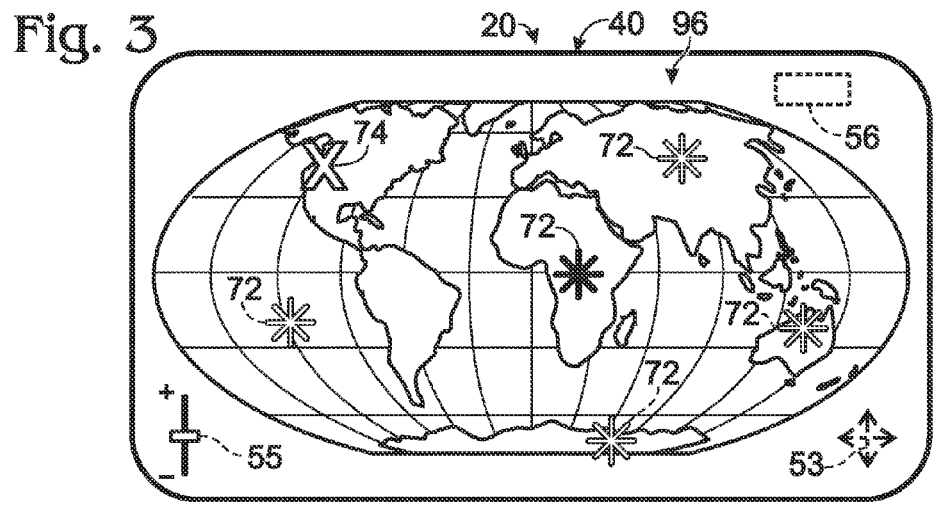
FIG. 3 is another schematic representation of illustrative, non-exclusive examples of information according to the present disclosure that may be displayed on a user interface.

As discussed, the systems and methods according to the present disclosure generally utilize a graphical password to authenticate a user. Thus, and subsequent to the entering the user name, the user then may select the "Enter Graphic Password" button, as indicated at 88. User interface 40 then may display an initial image 96, as illustrated in FIG. 3. In the illustrative, non-exclusive example of FIG. 3, initial image 96 is a map, a geographic image, a globe, and/or a cartographic data set; however, other initial images 96, such as those that are discussed and/or incorporated herein, are also within the scope of the present disclosure.

Initial image 96 may be centered on an initial point, or location, as indicated by the solid asterisk at 72. However, and as indicated by the open asterisk at 72, it is within the scope of the present disclosure that this initial location may be systematically and/or randomly varied each time that the user accesses initial image 96, views initial image 96, and/or attempts to access the electronic resource. Additionally or alternatively, it is also within the scope of the present disclosure that at least a portion, if not all, of a data set that comprises initial image 96 that is displayed on user interface 40 (and thus a zoom level and/or field of view of the data set that is displayed as initial image 96) may be systematically and/or randomly varied each time that the user accesses initial image 96, views initial image 96, and/or attempts to access the electronic resource. By varying and/or randomizing the scale, displayed region, and/or central portion of initial image 96, attempts to discern the user's graphic password by studying the user's inputs will be less likely to succeed.

Figure 4:
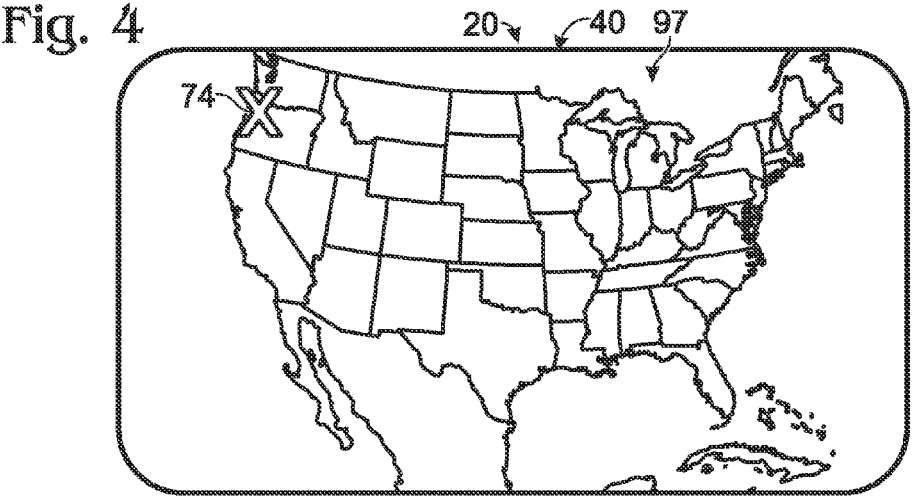
FIG. 4 is another schematic representation of illustrative, non-exclusive examples of information according to the present disclosure that may be displayed on a user interface.

Once initial image 96 is displayed, the user then may select a specific location within initial image 96, with this specific location corresponding to an authentication location that has been preselected by the user. This is illustrated in FIG. 3 at 74. Subsequently, and as illustrated in FIG. 4, user interface 40 may zoom within the initial image to generate an intermediate image 97. Intermediate image 97 may have a narrower field of view when compared to the initial image and/or may be centered on a different point than the initial image.

Selection of specific location 74 may be accomplished without entering keystrokes on a keyboard. As illustrative, non-exclusive examples, the user may utilize a pointing device, such as a mouse, to select the specific location, may touch the specific location on a touch screen, and/or may select and/or utilize one or more navigation arrows 53, which may be displayed on user interface 40. Information transfer system 20 and/or electronic resource 60 thereof then may center user interface 40 on the specific location automatically and/or subsequent to the user selecting an execute button 56.

Zooming in on specific location 74 also may be accomplished without entering keystrokes on a keyboard. As an illustrative, non-exclusive example, the user may utilize a pointing device to select a portion of initial image 96, and information transfer system 20 and/or electronic resource 60 thereof then may zoom within the selected portion of initial image 96 automatically and/or subsequent to the user selecting execute button 56. As another illustrative, non-exclusive example, the user may utilize a zoom slider 55 to select a desired zoom level within initial image 96, and information transfer system 20 and/or electronic resource 60 thereof then may zoom to the desired zoom level automatically and/or subsequent to the user selecting execute button 56.

Figure 5:
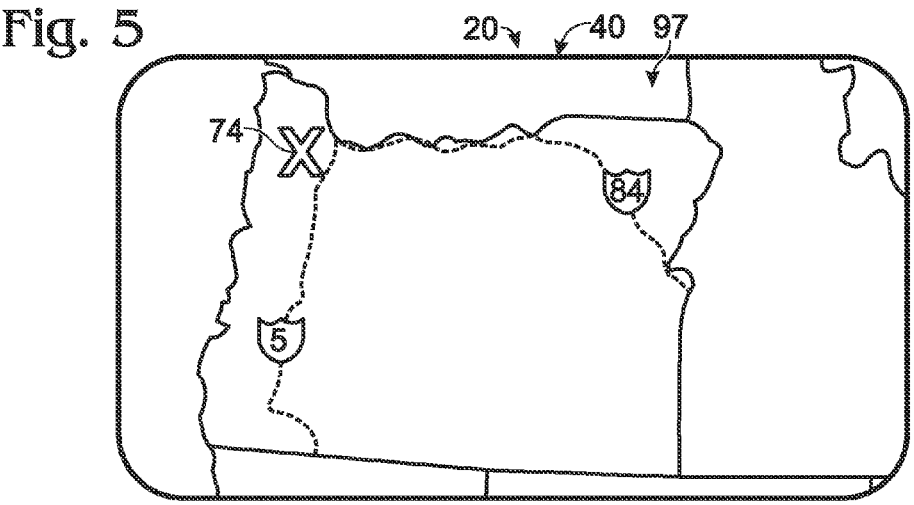
FIG. 5 is another schematic representation of illustrative, non-exclusive examples of information according to the present disclosure that may be displayed on a user interface.
Figure 6:
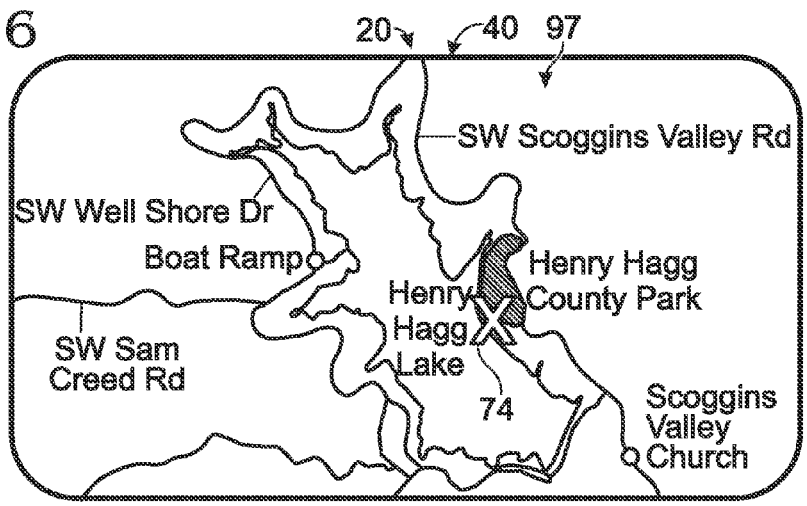
FIG. 6 is another schematic representation of illustrative, non-exclusive examples of information according to the present disclosure that may be displayed on a user interface.
Figure 7:
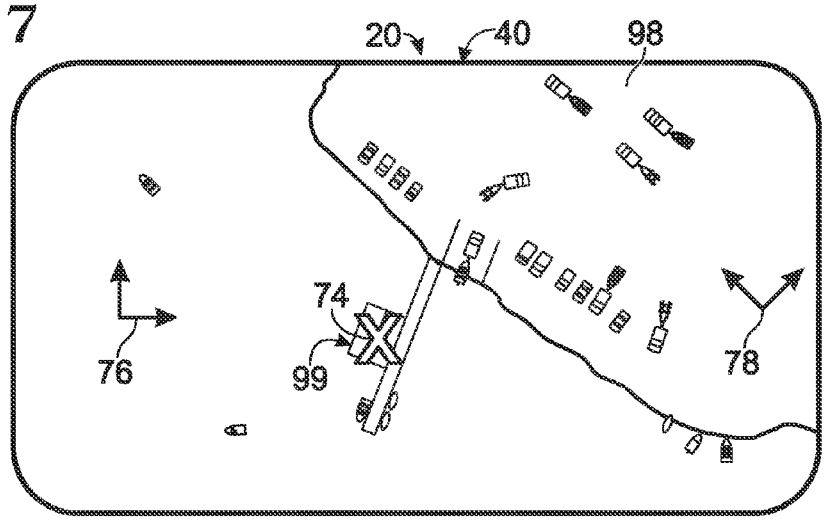
FIG. 7 is another schematic representation of illustrative, non-exclusive examples of information according to the present disclosure that may be displayed on a user interface.

As illustrated in FIGS. 5-6, this process of the user selecting a location within the image that is displayed on user interface 40 and the user interface panning and/or zooming based upon the user selection may be repeated a plurality of times until the user interface displays an authentication image 98 that includes an authentication location 99. As indicated in FIG. 7 at 74, the user then may select authentication location 99. The electronic resource then may compare authentication location 99 to the preselected authentication location. The user may be selectively granted access to the electronic resource if authentication location 99 (or the coordinates of the authentication location) matches the preselected authentication location, matches the preselected authentication location to within a threshold offset, and/or corresponds to the preselected authentication location. As discussed in more detail herein, the systems and methods according to the present disclosure may be adapted, configured, and/or programmed to transfer and/or convey information regarding authentication location 99 between the user interface and the electronic resource without conveying the actual (or resource-side) coordinates of the authentication location between the user interface and the electronic resource.

The systems and methods according to the present disclosure may be configured to protect the electronic resource from unauthorized access even if malicious software and/or an information intercept mechanism collects, observes, records, and/or otherwise intercepts communication between the electronic resource and the user interface. As an illustrative, non-exclusive example, and as discussed in more detail herein, authentication image 98 may be associated with a resource-side coordinate system that uniquely defines a plurality of locations within the authentication image, as illustrated in FIG. 7 at 76. However, the electronic resource may not transmit the resource-side coordinate system to user-interface 40. Instead, the electronic resource may encode the resource-side coordinate system to generate a user-side coordinate system that is different from the resource-side coordinate system, as illustrated in FIG. 7 at 78.

The electronic resource then may transmit the user-side coordinate system to the user interface together with the authentication image. The electronic resource may be configured to utilize a different (or session-specific) coordinate transformation to encode the resource-side coordinate system each time that the user attempts to access the electronic resource (or each time that the authentication image is transmitted to the user interface). Thus, and even if the information that is transferred between the user interface and the electronic resource were to be intercepted, this information could not be utilized to later gain access to the electronic resource.

Figure 8:
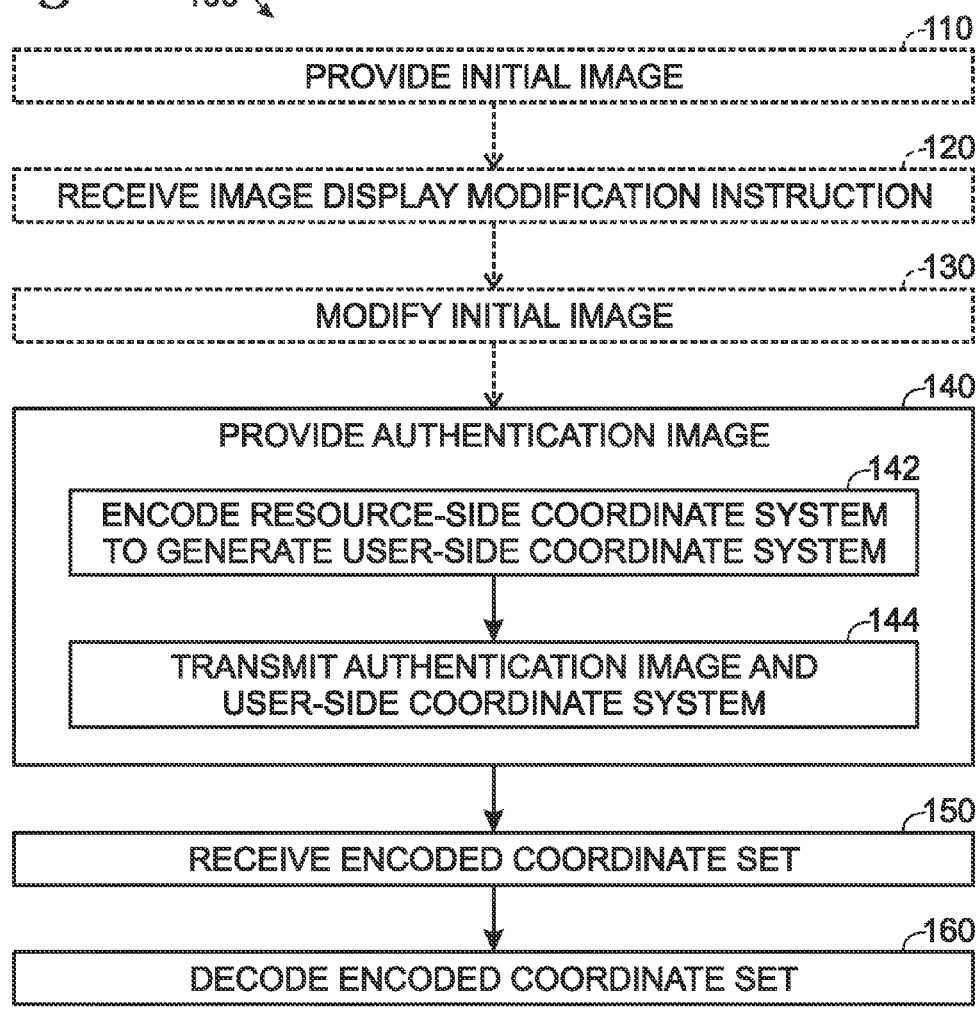
FIG. 8 is a flowchart depicting methods according to the present disclosure for transferring authentication information between a user and an electronic resource.

FIG. 8 is a flowchart depicting methods 100 according to the present disclosure of transferring authentication information between a user and an electronic resource. Methods 100 may include providing an initial image to a user interface at 110, receiving an image display modification instruction from the user interface at 120, and/or modifying the initial image to generate an authentication image at 130. Methods 100 further include providing the authentication image to the user interface at 140, receiving an encoded coordinate set from the user interface at 150, and decoding the encoded coordinate set to generate a decoded coordinate set at 160.

Providing the initial image to the user interface at 110 may include providing an initial image that is different from the authentication image, providing an initial image that defines a wider field of view than the authentication image, providing an initial image that includes the authentication image, and/or providing a navigable initial image that permits the user to modify a display thereof to thereby generate the authentication image. As an illustrative, non-exclusive example, the initial image may be any suitable graphical image, and the authentication image may be a zoomed (i.e., enlarged or reduced) portion of the initial image.

As another illustrative, non-exclusive example, the initial image may include and/or be a subset of an image data set that defines an overall image that also includes the authentication image. Under these conditions, the providing at 110 further may include randomly selecting a portion of the image data set that comprises the initial image. As an illustrative, non-exclusive example, the image data set may include and/or be a geographic data set, such as a globe, and the authentication image may include a selected, specified, and/or predetermined geographic location on the globe. Thus, the providing the initial image at 110 may include providing any suitable image of any suitable portion of the globe to the user interface, and this image may be different each time that the providing at 110 is performed and/or may be randomly selected each time that the providing at 110 is performed.

Receiving the image display modification instruction from the user interface at 120 may include receiving any suitable instruction, or series of instructions, that may permit, instruct, and/or direct the modifying at 130. As illustrative, non-exclusive examples, the image display modification instruction may include any suitable pan instruction that modifies a central point of the initial image to generate the authentication image, zoom instruction that modifies a field of view of the initial image to generate the authentication image, and/or navigation instruction that navigates to a different portion of the initial image (and/or of the image data set, when present) to generate the authentication image.

Modifying the initial image to generate the authentication image at 130 may include modifying the initial image based, at least in part, on the image display modification instruction. This may include panning, zooming, and/or navigating within the initial image (and/or within the image data set, when present) to generate the authentication image. It is within the scope of the present disclosure that the initial image that is provided at 110 may be a first initial image and that the providing at 110, the receiving at 120, and the modifying at 130 may be repeated any suitable number of times to generate any suitable number of intermediate initial images prior to generation of the authentication image at 130 and/or prior to providing the authentication image to the user interface at 140. As a more specific but still illustrative, non-exclusive example, the image display modification may include zoom instructions, and the modifying at 130 may include zooming within the initial image by at least a threshold zoom level to generate the authentication image. Illustrative, non-exclusive examples of the threshold level include threshold levels of at least 100%, at least 250%, at least 500%, at least 1,000%, at least 2,500%, at least 5,000%, at least 10,000%, or greater than 10,000%.

Providing the authentication image to the user interface at 140 may include providing any suitable authentication image to the user interface. Prior to the providing at 140, the authentication image is associated with, overlaid with, and/or has embedded therein a resource-side coordinate system that uniquely defines a plurality of locations within the authentication image. However, this resource-side coordinate system is not transmitted to the user interface with the authentication image. This is discussed in more detail herein with reference to the encoding at 142 and the transmitting at 144. In addition, the providing at 140 may include providing the authentication image to the user interface without storing the authentication image (or a digital representation thereof) on the user interface.

The authentication image may include and/or be any suitable image, graphic, and/or graphical object. As illustrative, non-exclusive examples, the authentication image may include, be, and/or define a portion of a map, a globe, a geographic data set, a cartographic data set, a user-navigable maze, a user-selected image that is selected prior to performing methods 100, and/or a user-provided image that is provided by the user prior to performing methods 100. As additional illustrative, non-exclusive examples, the authentication image may include and/or be a 2-dimensional image, a 3-dimensional image, and/or an image with greater than three dimensions (i.e., an n-dimensional image, wherein n>3).

It is within the scope of the present disclosure that the providing at 140 may include providing the authentication image for display on the user interface and/or displaying the authentication image on the user interface. Additionally or alternatively, the providing at 140 also may include retrieving the authentication image from a storage location, such as a stored memory location, prior to providing the authentication image to the user interface.

As discussed, the providing at 140 includes providing the authentication image to the user interface without providing, or transmitting, the resource-side coordinate system to the user interface. This may protect the resource-side coordinate system from being intercepted and/or recorded by malicious software that may be present on the user interface and/or by an information intercept mechanism that may be configured to intercept information that is transferred to the user interface and/or information that is received from the user interface. Thus, the providing at 140 further includes encoding the resource-side coordinate system to generate a user-side coordinate system at 142 and transmitting the authentication image and the user-side coordinate system to the user interface at 144.

Encoding the resource-side coordinate system at 142 may include encoding the resource-side coordinate system in any suitable manner to generate a user-side coordinate system that is different from the resource-side coordinate system. This may include applying any suitable session-specific coordinate transformation to the resource-side coordinate system to generate the user-side coordinate system.

As an illustrative, non-exclusive example, the encoding at 142 (and/or the session-specific coordinate transformation) may include performing at least one mathematical operation on the resource-side coordinate system to generate the user-side coordinate system. Illustrative, non-exclusive examples of mathematical operations include adding a constant to the resource-side coordinate system, multiplying the resource-side coordinate system by a constant, and/or applying any suitable mathematical function to the resource-side coordinate system. When the encoding at 142 includes adding a constant to the resource-side coordinate system and/or multiplying the resource-side coordinate system by a constant, the constant may be selected in any suitable manner. As illustrative, non-exclusive examples, the constant may be a preselected constant, a predetermined constant, a systematically selected constant, and/or a randomly generated constant.

It is within the scope of the present disclosure that the resource-side coordinate system may define any suitable number of coordinate axes and/or that these coordinate axes may be oriented in any suitable direction and/or relative orientation. As an illustrative, non-exclusive example, the resource-side coordinate system may include and/or be a Cartesian coordinate system, a cylindrical coordinate system, and/or a spherical coordinate system. As another illustrative, non-exclusive example, and when the resource-side coordinate system is a Cartesian coordinate system, the resource-side coordinate system may define one or more of an x-location within the authentication image, a y-location within the authentication image, and/or a z-location within the authentication image.

Additionally or alternatively, the resource-side coordinate system may define a plurality of coordinate axes, and the encoding at 142 may include encoding at least 1, at least 2, at least 3, or all of the plurality of coordinate axes. It is within the scope of the present disclosure that the encoding at 142 may include applying the same session-specific coordinate transformation to each of the plurality of coordinate axes. Alternatively, it is also within the scope of the present disclosure that the encoding at 142 may include applying a different session-specific coordinate transformation to at least one of the plurality of coordinate axes relative to one other of the plurality of coordinate axes and/or applying a different session-specific coordinate transformation to each of the plurality of coordinate axes.

It is within the scope of the present disclosure that the encoding at 142 may be performed at any suitable time, with any suitable sequence, and/or any suitable number of times within methods 100. As an illustrative, non-exclusive example, the encoding at 142 may be performed prior to the providing at 110, and the providing at 110 also may include transmitting the initial image and the user-side coordinate system to the user interface. As another illustrative, non-exclusive example, the receiving at 120 may include receiving image display modification instructions that are defined by, within, and/or relative to the user-side coordinate system. As yet another illustrative, non-exclusive example, the modifying at 130 may include modifying the initial image to generate the intermediate image, and the providing at 110 may include transferring the intermediate image and the user-side coordinate system to the user interface.

Transmitting the authentication image and the user-side coordinate system to the user interface at 144 may include transmitting the authentication image and the user-side coordinate system in any suitable manner. As illustrative, non-exclusive examples, the transmitting at 144 may include wirelessly transmitting, transmitting via a wired connection, transmitting via an intranet, and/or transmitting via the Internet.

Receiving the encoded coordinate set from the user interface at 150 may include receiving an encoded coordinate set that is identified by, defined within, and/or based upon the user-side coordinate system. The encoded coordinate set uniquely identifies an authentication location that has been selected by the user from the plurality of locations that may be defined within the authentication image by the user-side coordinate set. It is within the scope of the present disclosure that the encoded coordinate set may be selected, or input, by the user in any suitable manner. As illustrative, non-exclusive examples, the encoded coordinate set may be selected by the user with a pointing device, with a mouse, and/or with a touch screen. As another illustrative, non-exclusive example, and as discussed, the encoded coordinate set may be selected without the user inputting keystrokes on a keyboard and/or without inputting a specific sequence of alphanumeric keystrokes to generate a corresponding alphanumeric sequence.

Decoding the encoded coordinate set at 160 may include decoding the encoded coordinate set in any suitable manner. This may include decoding to generate a decoded coordinate set that uniquely identifies the authentication location within the authentication image and is identified by, defined within, and/or based upon the resource-side coordinate system. As an illustrative, non-exclusive example, the decoding at 160 may include utilizing, reversing, and/or inverting the session-specific coordinate transformation to decode the encoded coordinate set and generate the decoded coordinate set (and/or to define the authentication location within the resource-side coordinate system). Thus, methods 100 may permit determining the decoded coordinate set without transferring the decoded coordinate set between the user interface and the electronic resource, thereby increasing the security of authentication information transfer.

FIG. 9 is a flowchart depicting methods 200 according to the present disclosure of defining authentication information to authenticate a user for access to an electronic resource from a user interface. Methods 200 may include defining an authentication image at 210 and/or receiving a user name from the user at 220. Methods 200 further include determining a decoded coordinate set at 230 and defining a user-specific authentication data set at 240. Methods 200 also may include associating the user name with the authentication data set at 250 and/or associating the user name with the authentication image at 260.

Defining the authentication image at 210 may include defining the authentication image in any suitable manner and may be performed prior to the determining at 230 and/or prior to the defining at 240. As an illustrative, non-exclusive example, the defining at 210 may include receiving the authentication image (or an electronic representation thereof) from the user interface. As another illustrative, non-exclusive example, the defining at 210 also may include providing a plurality of images, or image choices, to the user interface and subsequently receiving a user input from the user interface that is indicative of a selected image of the plurality of images, with the selected image subsequently being utilized as the authentication image.

Receiving the user name from the user interface at 220 may include receiving any suitable user name that may, or may be utilized to, identify, or uniquely identify, the user. As discussed herein, the user name subsequently may be associated with the authentication image and/or with the decoded coordinate set to permit subsequent authentication of the user through receipt of the user name and the decoded coordinate set.

Determining the decoded coordinate set at 230 may include determining any suitable decoded coordinate set that may uniquely define, identify, and/or specify an authentication location within the authentication image (such as a location that the user might subsequently select to authenticate the user's identity). As an illustrative, non-exclusive example, the determining at 230 may include performing methods 100, which are discussed in more detail herein.

Defining the user-specific authentication data set at 240 may include defining any suitable authentication data set based, at least in part, on the decoded coordinate set that was determined at 230. As illustrative, non-exclusive examples, the defining at 240 may include storing the decoded coordinate set, concatenating two or more components of the decoded coordinate set, applying a hash function to the decoded coordinate set, and/or utilizing a lookup table to generate the user-specific authentication data set from the decoded coordinate set. The user-specific authentication data set, which also may be referred to herein as a password and/or as a resource-side password, may be utilized to authenticate the user prior to permitting the user to access protected information that may be present on an electronic resource, such as is discussed in more detail herein with reference to methods 300.

Associating the user name with the authentication data set at 250 and/or associating the user name with the authentication image at 260 may include labeling, tagging, indexing, and/or identifying the user name with the corresponding authentication data set and/or authentication image. Additionally or alternatively, the associating at 250 and 260 also may include establishing a user-specific authentication data set and/or a user-specific authentication image, respectively, that is associated with the user name.

As an illustrative, non-exclusive example, a method of authenticating a user (such as methods 300, which are discussed in more detail herein) may include receiving the user name from the user and providing the user-specific authentication image to the user interface to permit the user to identify and/or specify an authentication location within the authentication image. The authentication location may be utilized to determine a decoded coordinate set (such as by using methods 100), which may be compared to the user-specific authentication data set to determine whether or not to permit the user to access the electronic resource.

As a more specific but still illustrative, non-exclusive example, methods 200 may be utilized when a user establishes an account (which may have a user name and password associated therewith) on, or with, an electronic resource. For the purposes of simplicity in this example, the user interface will be referred to as a personal computer, and the electronic resource will be referred to as an account provider; however, other user interfaces and/or electronic resources, including those that are discussed herein, are also within the scope of the present disclosure.

To establish an account, the user may direct the personal computer to a web page that is hosted by, in communication with, and/or acts as an access gateway to the account provider. The user then may indicate on the web site that an account (or other user identification, or user name) is to be established. Subsequently, and as discussed herein with reference to the defining at 210, an authentication image and/or an initial image (which also may be referred to herein as a graphic) may be defined for the user. This may include the user selecting a desired graphic from a plurality of graphics that may be transmitted to the personal computer by the account provider, the user uploading a user-provided graphic to the account provider, and/or the account provider selecting a graphic or utilizing a predetermined graphic for the user. In addition, and as discussed herein with reference to the receiving at 220, the user also may enter a user name into the personal computer and subsequently transmit the user name to the account provider. The user name additionally or alternatively may be referred to as a user ID or user identifier, and in some instances may be an email address or other contact identifier for the user.

Then, and as discussed herein with reference to the determining at 230, the account provider may determine a decoded coordinate set (which subsequently may be utilized to generate the password for the user), such as by using methods 100 that are discussed herein. This optionally may include the account provider providing the initial image to the personal computer (as discussed herein with reference to the providing at 110), and the user directing the account provider to modify the initial image (such as by zooming and/or panning within the initial image as discussed herein with reference to the receiving at 120 and the modifying at 130) to generate the authentication image. The authentication image then may be provided to the personal computer by the account provider (as discussed herein with reference to the providing at 140) and displayed by the personal computer.

In addition (and as discussed herein with reference to the encoding at 142), the account provider also may encode a resource-side coordinate system that is associated with the authentication image to generate a user-side coordinate system that is different from the resource-side coordinate system. The account provider then may transmit the user-side coordinate system to the personal computer (such as during the transmitting at 144). The user then may indicate a portion of the authentication image that is memorable to the user (i.e., an authentication location), such as through the use of any suitable pointing device, and a location of this portion of the authentication image, as defined within the user-side coordinate system, may be transmitted from the personal computer to the account provider as an encoded coordinate set (as discussed herein with reference to the receiving at 150). The account provider then may decode the encoded coordinate set to generate the decoded coordinate set (as discussed herein with reference to the decoding at 160).

Subsequent to determination of the decoded coordinate set, and as discussed herein with reference to the defining at 240, the account provider then may define a user-specific authentication data set (i.e., a password) that is based, at least in part, on the decoded coordinate set. The account provider also may associate this password with the user name (as discussed herein with reference to the associating at 250) and/or may associate the authentication image and/or the initial image with the user name (as discussed herein with reference to the associating at 260), thereby permitting the account provider to later authenticate the user, such as by utilizing methods 300 (which are discussed below).

FIG. 10 is a flowchart depicting methods 300 according to the present disclosure of authenticating a user for access to an electronic resource from a user interface. It is within the scope of the present disclosure that methods 300 may be a primary authentication method, such as when methods 300 define a standard, or preferred, method of authenticating the user. Additionally or alternatively, it is also within the scope of the present disclosure that methods 300 may be a secondary authentication method, such as when methods 300 are utilized as an alternative to another primary authentication method and/or when methods 300 are utilized when a user forgets a password that functions as the primary authentication method (e.g., methods 300 might be utilized when the user forgets the password).

Methods 300 include receiving an authentication query from the user interface at 310 and receiving a decoded coordinate set at 320. Methods 300 further include comparing the decoded coordinate set to a user-specific authentication data set at 330, and selectively granting access to the electronic resource at 340 or selectively denying access to the electronic resource at 350.

Receiving the authentication query from the user interface at 310 may include receiving any suitable authentication query that may indicate that the user desires access to the electronic resource and/or that the user desires access to protected information that may be contained thereon. As an illustrative, non-exclusive example, the receiving at 310 may include receiving a user name from the user interface (such as via the user entering the user name on the user interface and subsequently transmitting the user name from the user interface to the electronic resource). As discussed herein, the user name may be known to the electronic resource and/or already may be associated with a user-specific authentication image and/or with a user-specific authentication data set. As such, the receiving at 310 may permit the electronic resource to validate and/or authenticate the user for access to the electronic resource by performing a remainder of methods 300.

Receiving the decoded coordinate set at 320 may include receiving any suitable decoded coordinate set that may uniquely define, identify, and/or specify an authentication location within an authentication image. As an illustrative, non-exclusive example, the determining at 320 may include performing methods 100, which are discussed in more detail herein.

The user name that may be obtained during the receiving at 310 may be associated with a predetermined, or user-specific, authentication image and/or with a predetermined, or user-specific, initial image that was previously associated with the user name (such as during methods 200, which are discussed herein). As such, the determining at 320 may include providing the predetermined authentication image and/or the predetermined initial image to the user interface (such as during the providing at 140 that is discussed in more detail herein with reference to methods 100).

Comparing the decoded coordinate set to the user-specific authentication data set at 330 may include comparing the decoded coordinate set to the user-specific authentication data set in any suitable manner to determine if the decoded coordinate set corresponds to the user-specific authentication data set. As illustrative, non-exclusive examples, the comparing at 330 may include determining that the decoded coordinate set matches, or is identical to, the user-specific authentication data set, determining that the decoded coordinate set matches the user-specific authentication data set to within a threshold coordinate offset, and/or determining that the user-specific authentication data set was established based upon the decoded coordinate set and/or based upon a coordinate set that matches the decoded coordinate set to within the threshold coordinate offset.

Selectively granting access to the electronic resource at 340 or selectively denying access to the electronic resource at 350 may include selectively granting or denying access to the electronic resource based, at least in part, on the comparing at 330. As an illustrative, non-exclusive example, the selectively granting at 340 may include granting the user access to the electronic resource responsive to determining that the decoded coordinate set corresponds to the user-specific authentication data set, matches the user-specific authentication data set, and/or matches the user-specific authentication data set to within a threshold offset amount. This may include selectively granting the user access to any suitable electronic resource, illustrative, non-exclusive examples of which are discussed herein.

As another illustrative, non-exclusive example, the selectively denying at 350 may include denying the user access to the electronic resource responsive to the determining that the decoded coordinate set does not correspond to the user-specific authentication data set, does not match the user-specific authentication data set, and/or does not match the user-specific authentication data set to within the threshold offset amount. This may include restricting the user's access to the electronic resource.

As a more specific but still illustrative, non-exclusive example, methods 300 may be utilized to authenticate a user who has already established an account on the electronic resource. Continuing the more specific but still illustrative, non-exclusive example that was discussed herein with reference to methods 200, the user may direct a personal computer to display a web page that is hosted by, in communication with, and/or acts as an access gateway to an account provider. On the web page, the user may indicate a desire to log into an account that is maintained by the account provider. This may include sending any suitable authentication query to the account provider and receipt of the authentication query by the account provider (as discussed herein with reference to the receiving at 310).

As an illustrative, non-exclusive example, the user may submit a user name to the account provider. Upon receipt of the user name by the account provider, the account provider may determine a decoded coordinate set (which subsequently may be compared to the password for the user), such as by using methods 100. As discussed, this may include the account provider providing an initial image to the personal computer, the personal computer displaying the initial image, the user modifying the initial image, the account provider providing an authentication image to the personal computer, and the personal computer displaying the authentication image (as discussed herein with reference to the providing at 110, the receiving at 120, the modifying at 130, and the providing at 140). The account provider also may provide a user-side coordinate system to the personal computer (as discussed herein with reference to the encoding at 142 and the transmitting at 144).

Subsequently, the user may indicate a portion of the authentication image that was selected by the user when the account was established (i.e., the authentication location). The personal computer then may transmit an encoded coordinate set, which defines the authentication location within the user-side coordinate system, to the account provider (as discussed herein with reference to the receiving at 150). The account provider then may decode the encoded coordinate set to generate the decoded coordinate set (as discussed herein with reference to the decoding at 160).

Subsequent to determination of the decoded coordinate set, and as discussed herein with reference to the comparing at 330, the account provider may compare the decoded coordinate set to the password that is associated with the provided user name. The account provider then will grant the user access to the account if it is determined that the decoded coordinate set corresponds to the user's password (as discussed herein with reference to the selectively granting at 340) or will deny the user access to the account if it is determined that the decoded coordinate set does not correspond to the user's password (as discussed herein with reference to the selectively denying at 350).

As discussed herein, the resource-side coordinate system is different from the user-side coordinate system. Therefore, the decoded coordinate set, which defines a location of the authentication location within the resource-side coordinate system, is different from the encoded coordinate set, which defines the location of the authentication location within the user-side coordinate system. Since the resource-side coordinate system and the decoded coordinate set are never transmitted between the personal computer and the account provider, they cannot be intercepted by an unauthorized individual. In addition, and as discussed, the user-side coordinate system may be defined differently each time that the user requests access to the account. Thus, and even if the encoded coordinate set and/or the user-side coordinate system were to be intercepted by an unauthorized individual, this information would not permit the unauthorized individual to access the account at a later date, thereby providing additional security for the user authentication process.

The systems and methods disclosed herein include selecting an authentication location from within an authentication image. It is within the scope of the present disclosure that the authentication image may include and/or be any suitable image that includes, illustrates, displays, and/or represents the authentication location and/or that includes, illustrates, displays, and/or represents the authentication location with at least a threshold zoom level and/or resolution level. As such, and when methods 100, 200, and/or 300 are performed a plurality of times, an overall zoom level, resolution level, center point, and/or field of view of various images from which the authentication location is selected may vary. However, each of these various images still may be referred to herein as the authentication image when these various images include, illustrate, display, and/or represent the authentication location and/or when the user selects the authentication location therefrom.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

In some implementations, the systems and methods disclosed herein may be described in the general context of computer-executable instructions, such as program modules, being executed by a computing and/or communications device. These methods and/or instructions may be stored on a storage medium suitable for storing computer-executable instructions, or software, for implementing the systems and methods according to the present disclosure. Illustrative, non-exclusive examples of such media include CD-ROMs, disks, hard drives, random access memory, and/or read only memory. However, these are but illustrative, non-exclusive examples of suitable implementations, and others may be used without departing from the scope of the present disclosure.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of transferring authentication information between a user and an electronic resource, the method comprising:
  providing an authentication image to a user interface, wherein the authentication image is associated with a resource-side coordinate system that uniquely defines a plurality of locations within the authentication image, and further wherein the providing includes:
    (i) encoding the resource-side coordinate system using a session-specific coordinate transformation to generate a user-side coordinate system that is different from the resource-side coordinate system; and
    (ii) transmitting the authentication image and the user-side coordinate system to the user interface;
  receiving an encoded coordinate set from the user interface, wherein the encoded coordinate set uniquely specifies an authentication location that is user-selected from the plurality of locations within the authentication image and that is identified in the user-side coordinate system; and
  decoding the encoded coordinate set by reversing the session-specific coordinate transformation to generate a decoded coordinate set that uniquely specifies the authentication location and that is identified in the resource-side coordinate system.

A2. The method of paragraph A1, wherein the authentication image includes at least one of a map, a globe, a geographic data set, a cartographic data set, a user-selected image, and a user-provided image.

A3. The method of any of paragraphs A1-A2, wherein the authentication image includes one of a 2-dimensional image, a 3-dimensional image, and an image with greater than three dimensions.

A4. The method of any of paragraphs A1-A3, wherein the authentication image includes a portion of a user-navigable maze.

A5. The method of any of paragraphs A1-A4, wherein, prior to the providing the authentication image, the method further includes:

(i) providing an initial image to the user interface;

(ii) receiving an image display modification instruction from the user interface; and (iii) modifying the initial image based, at least in part, on the image display modification instruction to generate the authentication image.

A6. The method of paragraph A5, wherein the image display modification instruction includes at least one of a pan instruction, a zoom instruction, and a navigation instruction.

A7. The method of any of paragraphs A5-A6, wherein the image display modification instruction includes a zoom instruction, and further wherein modifying includes magnifying the initial image by at least 1,000% to generate the authentication image.

A8. The method of any of paragraphs A5-A7, wherein the initial image is a subset of an image data set that defines an overall image, and further wherein the method includes randomly selecting a portion of the image data set that comprises the initial image.

A9. The method of any of paragraphs A1-A8, wherein the encoding includes performing at least one mathematical operation on the resource-side coordinate system to generate the user-side coordinate system.

A10. The method of paragraph A9, wherein the mathematical operation includes at least one of:

(i) adding a constant to the resource-side coordinate system;

(ii) multiplying the resource-side coordinate system by a constant; and)

(iii) applying a mathematical function to the resource-side coordinate system.

A11. The method of paragraph A10, wherein the constant includes one of a predetermined constant, a preselected constant, a systematically selected constant, and a randomly generated constant.

A12. The method of any of paragraphs A1-A11, wherein the resource-side coordinate system defines at least one, and optionally at least two, and further optionally all, of:

(i) an x-location within the authentication image;

(ii) a y-location within the authentication image; and (iii) a z-location within the authentication image.

A13. The method of any of paragraphs A1-A12, wherein the resource-side coordinate system defines a plurality of coordinate axes, and further wherein the encoding includes encoding each of the plurality of coordinate axes.

A14. The method of paragraph A13, wherein the encoding includes one of:

(i) applying the same session-specific coordinate transformation to each of the plurality of coordinate axes; and (ii) applying a different session-specific coordinate transformation to at least one of the plurality of coordinate axes relative to one other of the coordinate axes.

A15. The method of any of paragraphs A1-A14, wherein the transmitting includes at least one of wirelessly transmitting, transmitting via a wired connection, transmitting via an intranet, and transmitting via the Internet.

A16. The method of any of paragraphs A1-A15, wherein the receiving the encoded coordinate set includes receiving an encoded coordinate set that was input into the user interface by the user without the user inputting keystrokes on a keyboard.

A17. The method of any of paragraphs A1-A16, wherein the decoding includes reversing the session-specific coordinate transformation to define the authentication location within the resource-side coordinate system.

A18. The method of any of paragraphs A1-A17, wherein the user interface includes at least one of a personal computer, a laptop computer, a wireless computer, a tablet device, an electronic device, a cellular phone, a smartphone, a personal digital assistant, and a terminal.

A19. The method of any of paragraphs A1-A18, wherein the electronic resource includes at least one of:

(i) a user account, optionally with a service provider;

(ii) an information vault that is configured to store one of user information and user login information; and (iii) a gateway to another electronic resource.

A20. The method of any of paragraphs A1-A19, wherein the method includes performing the method without transferring the decoded coordinate set between the user interface and the electronic resource.

A21. The method of any of paragraphs A1-A20, wherein the providing the authentication image includes providing the authentication image without storing the authentication image within the user interface.

A22. The method of any of paragraphs A1-A21, wherein the providing the authentication image includes providing the authentication image for display on the user interface.

A23. The method of any of paragraphs A1-A22, wherein the method further includes displaying the authentication image on the user interface.

A24. The method of any of paragraphs A1-A23, wherein, prior to the providing the authentication image, the method further includes retrieving the authentication image from stored memory.

A25. The method of any of paragraphs A1-A24, wherein the authentication information at least one of:

(i) includes a password for gaining access to the electronic resource;

(ii) is associated with the password for gaining access to the electronic resource;

(iii) represents the password for gaining access to the electronic resource; and (iv) is the password for gaining access to the electronic resource.

B1. A method of defining authentication information to authenticate a user for access to an electronic resource from a user interface, the method comprising:

determining a decoded coordinate set by performing the method of any of paragraphs A1-A25; and defining a user-specific authentication data set, wherein the user-specific authentication data set is based, at least in part, on the decoded coordinate set.

B2. The method of paragraph B1, wherein, prior to the providing the authentication image, the method further includes defining the authentication image.

B3. The method of paragraph B2, wherein the defining the authentication image includes at least one of:

(i) receiving the authentication image from the user interface; and (ii) providing a plurality of images to the user interface and receiving a user input that is indicative of a selected image of the plurality of images that defines the authentication image.

B4. The method of any of paragraphs B1-B3, wherein the method further includes receiving a user name from the user interface.

B5. The method of paragraph B4, wherein the method further includes associating the user name with the authentication data set.

B6. The method of any of paragraphs B4-B5, wherein the method further includes associating the user name with the authentication image.

C1. A method of authenticating a user for access to an electronic resource from a user interface, the method comprising:
receiving an authentication query from the user interface;
determining a decoded coordinate set by performing the method of any of paragraphs A1-A25;
comparing the decoded coordinate set to a user-specific authentication data set; and
one of:
(i) selectively granting the user access to the electronic resource responsive to determining that the decoded coordinate set corresponds to the user-specific authentication data set; and
(ii) selectively denying the user access to the electronic resource responsive to determining that the decoded coordinate set does not correspond to the user-specific authentication data set.

C2. The method of paragraph C1, wherein the receiving the authentication query from the user interface includes receiving a user name from the user interface.

C3. The method of paragraph C2, wherein the providing the authentication image includes at least one of providing a predetermined authentication image that was previously associated with the user name and providing an initial image that was previously associated with the user name.

C4. The method of any of paragraphs C1-C3, wherein the determining that the decoded coordinate set corresponds to the user-specific authentication data set includes at least one of:
(i) determining that the decoded coordinate set matches the user-specific authentication data set;
(ii) determining that the decoded coordinate set is identical to the user-specific authentication data set; and
(iii) determining that the user-specific authentication data set was established based upon the decoded coordinate set.

C5. The method of any of paragraphs C1-C4, wherein the selectively granting includes at least one of selectively granting the user access to an email account, selectively granting the user access to a data vault, selectively granting the user access to a financial account, and selectively granting the user access to an online account.

C6. The method of any of paragraphs C1-C5, wherein the selectively denying includes restricting the user's access to the electronic resource.

D1. Computer readable storage media including computer-executable instructions that, when executed, direct an electronic resource to perform the method of any of paragraphs A1-C6.

D2. An electronic resource, comprising:
a memory device including computer-executable instructions that, when executed, direct the electronic resource to perform the method of any of paragraphs A1-C6.

D3. An information transfer system, comprising:
a user interface;
the electronic resource of paragraph D2; and
an information transfer mechanism that is configured to transfer information between the user interface and the electronic resource.

INDUSTRIAL APPLICABILITY

The systems and methods disclosed herein are applicable to the electronic, information technology, and electronic user authentication industries.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method of authenticating a user for access to an electronic resource from a user interface, the method comprising:
receiving an authentication query from the user interface, wherein the receiving the authentication query includes receiving a user name from the user interface;
receiving authentication information that corresponds to the user name from the user interface, wherein the receiving the authentication information includes:
providing an authentication image to the user interface, wherein the authentication image is associated with a resource-side coordinate system that uniquely defines a plurality of locations within the authentication image, wherein the authentication image includes a map, and further wherein the providing includes:
(i) encoding the resource-side coordinate system using a session-specific coordinate transformation to generate a user-side coordinate system that is different from the resource-side coordinate system; and
(ii) transmitting the authentication image and the user-side coordinate system to the user interface;
receiving an encoded coordinate set from the user interface, wherein the encoded coordinate set uniquely specifies a single authentication location that is user-selected from the plurality of locations within the authentication image and that is identified in the user-side coordinate system; and
decoding the encoded coordinate set by reversing the session-specific coordinate transformation to generate a decoded coordinate set that uniquely specifies the authentication location and that is identified in the resource-side coordinate system; and
comparing the decoded coordinate set to a previously defined user-specific authentication data set; and one of:

(i) selectively granting the user access to the electronic resource responsive to determining that the decoded coordinate set corresponds to the user-specific authentication data set; and (ii) selectively denying the user access to the electronic resource responsive to determining that the decoded coordinate set does not correspond to the user-specific authentication data set.

2. A method of transferring authentication information between a user and an electronic resource, the method comprising:

providing an authentication image to a user interface, wherein the authentication image is associated with a resource-side coordinate system that uniquely defines a plurality of locations within the authentication image, wherein the authentication image includes a map, and further wherein the providing includes:

(i) encoding the resource-side coordinate system using a session-specific coordinate transformation to generate a user-side coordinate system that is different from the resource-side coordinate system; and (ii) transmitting the authentication image and the user-side coordinate system to the user interface;

receiving an encoded coordinate set from the user interface, wherein the encoded coordinate set uniquely specifies a single authentication location that is user-selected from the plurality of locations within the authentication image and that is identified in the user-side coordinate system; and decoding the encoded coordinate set by reversing the session-specific coordinate transformation to generate a decoded coordinate set that uniquely specifies the authentication location and that is identified in the resource-side coordinate system.

3. The method of claim 2, wherein the authentication information includes a password for gaining access to the electronic resource.

4. The method of claim 2, wherein, prior to the providing the authentication image, the method further includes:

(i) providing an initial image to the user interface;

(ii) receiving an image display modification instruction from the user interface; and (iii) modifying the initial image based, at least in part, on the image display modification instruction to generate the authentication image.

5. The method of claim 4, wherein the image display modification instruction includes at least one of a pan instruction, a zoom instruction, and a navigation instruction.

6. The method of claim 4, wherein the initial image is a subset of an image data set that defines an overall image, and further wherein the method includes randomly selecting a portion of the image data set that comprises the initial image.

7. The method of claim 6, wherein the initial image is a subset of the map, and further wherein the method includes randomly selecting a portion of the map that comprises the initial image.

8. The method of claim 2, wherein the encoding includes performing at least one mathematical operation on the resource-side coordinate system to generate the user-side coordinate system.

9. The method of claim 8, wherein the mathematical operation includes at least one of:

(i) adding a first constant to the resource-side coordinate system;

(ii) multiplying the resource-side coordinate system by a second constant; and (iii) applying a mathematical function to the resource-side coordinate system.

10. The method of claim 2, wherein the receiving the encoded coordinate set includes receiving an encoded coordinate set that was input into the user interface by the user without the user inputting keystrokes on a keyboard.

11. The method of claim 2, wherein the decoding includes reversing the session-specific coordinate transformation to define the authentication location within the resource-side coordinate system.

12. The method of claim 2, wherein the method includes performing the method without transferring the decoded coordinate set between the user interface and the electronic resource.

13. The method of claim 2, wherein the providing the authentication image includes providing the authentication image without storing the authentication image within the user interface.

14. A method of defining authentication information to authenticate a user for access to an electronic resource from a user interface, the method comprising:

determining a decoded coordinate set by performing the method of claim 2; and defining a user-specific authentication data set, wherein the user-specific authentication data set is based, at least in part, on the decoded coordinate set.

15. The method of claim 14, wherein the method further includes receiving a user name from the user interface, and further wherein the method includes at least one of:

(i) associating the user name with the authentication data set; and (ii) associating the user name with the authentication image.

16. Non-transitory computer readable storage media including computer-executable instructions that, when executed, direct an electronic resource to transfer authentication information between a user and the electronic resource by:

providing an authentication image to a user interface, wherein the authentication image is associated with a resource-side coordinate system that uniquely defines a plurality of locations within the authentication image, wherein the authentication image includes a map, and further wherein the providing includes:

(i) encoding the resource-side coordinate system using a session-specific coordinate transformation to generate a user-side coordinate system that is different from the resource-side coordinate system; and (ii) transmitting the authentication image and the user-side coordinate system to the user interface;

receiving an encoded coordinate set from the user interface, wherein the encoded coordinate set uniquely specifies a single authentication location that is user-selected from the plurality of locations within the authentication image and that is identified in the user-side coordinate system; and decoding the encoded coordinate set by reversing the session-specific coordinate transformation to generate a decoded coordinate set that uniquely specifies the authentication location and that is identified in the resource-side coordinate system.

17. An information transfer system, comprising:

a user interface;

an electronic resource including a memory device including computer-executable instructions that, when executed, direct the electronic resource to receive authentication information from the user interface by:

providing an authentication image to the user interface, wherein the authentication image is associated with a resource-side coordinate system that uniquely defines a plurality of locations within the authentication image, wherein the authentication image includes a map, and further wherein the providing includes:
  (i) encoding the resource-side coordinate system using a session-specific coordinate transformation to generate a user-side coordinate system that is different from the resource-side coordinate system; and
  (ii) transmitting the authentication image and the user-side coordinate system to the user interface;
receiving an encoded coordinate set from the user interface, wherein the encoded coordinate set uniquely specifies a single authentication location that is user-selected from the plurality of locations within the authentication image and that is identified in the user-side coordinate system; and
decoding the encoded coordinate set by reversing the session-specific coordinate transformation to generate a decoded coordinate set that uniquely specifies the authentication location and that is identified in the resource-side coordinate system; and
an information transfer mechanism that is configured to transfer information between the user interface and the electronic resource.

* * * * *